United States Patent
Kang

(10) Patent No.: US 7,224,386 B2
(45) Date of Patent: *May 29, 2007

(54) SELF-CALIBRATION FOR A CATADIOPTRIC CAMERA

(75) Inventor: Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 237 days.

This patent is subject to a terminal disclaimer.

(21) Appl. No.: 11/015,822

(22) Filed: Dec. 15, 2004

(65) Prior Publication Data

US 2005/0099501 A1    May 12, 2005

Related U.S. Application Data

(62) Division of application No. 09/591,781, filed on Jun. 12, 2000, now Pat. No. 6,870,563.

(51) Int. Cl.
*H04N 5/228* (2006.01)
*H04N 5/262* (2006.01)
*H04N 5/225* (2006.01)
*H04N 7/00* (2006.01)
*G06K 9/32* (2006.01)

(52) U.S. Cl. ............ 348/222.1; 348/239; 348/207.99; 348/36; 348/335; 382/294

(58) Field of Classification Search .............. None
See application file for complete search history.

(56) References Cited

U.S. PATENT DOCUMENTS 6,346,967 B1 * 2/2002 Gullichsen et al. .... 348/207.99

* cited by examiner

*Primary Examiner*—Thai Q. Tran
*Assistant Examiner*—Heather R. Jones
(74) *Attorney, Agent, or Firm*—Lyon & Harr, L.L.P.; Craig S. Fischer

(57) ABSTRACT

A method and a system for self-calibrating a wide field-of-view camera (such as a catadioptric camera) using a sequence of omni-directional images of a scene obtained from the camera. The present invention uses the consistency of pairwise features tracked across at least a portion of the image collection and uses these tracked features to determine unknown calibration parameters based on the characteristics of catadioptric imaging. More specifically, the self-calibration method of the present invention generates a sequence of omni-directional images representing a scene and tracks features across the image sequence. An objective function is defined in terms of the tracked features and an error metric (an image-based error metric in a preferred embodiment). The catadioptric imaging characteristics are defined by calibration parameters, and determination of optimal calibration parameters is accomplished by minimizing the objective function using an optimizing technique.

20 Claims, 6 Drawing Sheets

SELF-CALIBRATION FOR A CATADIOPTRIC CAMERA

CROSS REFERENCE TO RELATED APPLICATIONS

This application is a divisional application of U.S. patent application Ser. No. 09/591,781, entitled "Self-Calibration for a Catadioptric Camera," filed Jun. 12, 2000 now U.S. Pat. No. 6,870,563, now allowed, the entire contents of which are hereby incorporated by reference.

BACKGROUND OF THE INVENTION

1. Field of the Invention

The present invention relates in general to camera calibration and more particularly to a method and a system for self-calibrating a wide field-of-view camera (such as a catadioptric camera) using a sequence of omni-directional images of a scene obtained from the camera.

2. Related Art

Cameras having a wide field of view are important in several diverse applications. By way of example, wide field-of-view cameras are used in applications such as surveillance, video conferencing, multimedia-based applications (such as games), autonomous navigation, advertising (especially in the areas of real estate and tourism) and scene reconstruction. Wide field-of-view cameras are used to capture most or all of a region of interest (or scene) while using a minimum number of cameras.

One type of wide field-of-view camera is a catadioptric camera. In general, a catadioptric camera uses a combination of reflecting surfaces (such as mirrors) and lenses to achieve an omni-directional view of a scene. These reflecting surfaces, however, tend to cause image distortion. Image distortion is inherent in a catadioptric camera because light rays at a periphery of the field of view are severely curved to allow the use of a smaller, inexpensive image detectors (such as a charge-coupled device or CCD). Otherwise, prohibitively large and expensive image detectors would be needed to capture the entire field of view. The image distortions tend to pull points toward an optical center of the camera, thus making straight lines within a scene appear curved in an image of the scene.

If optical characteristics of a catadioptric camera system are known, then the parameters that map the curves in the image into straight lines can be applied. Unfortunately, however, these parameters are seldom known accurately and optical characteristics tend to vary between particular camera systems. This requires that a catadioptric camera be calibrated in order to determine calibration parameters that will characterize incident light rays and thus account for optical distortion.

Several types of calibration techniques are used to calibrate catadioptric cameras. In one calibration technique the camera photographs a calibration pattern and uses the pattern to calibrate the camera. One disadvantage, however, of this technique is that the calibration pattern is large and using the pattern is awkward and time-consuming. Another calibration technique involves a user selecting a number of points along straight lines of the scene (which are curved in the image). One disadvantage with this technique, however, is that the user must take the time to supply the calibration system with the data needed to correctly calibrate the camera. In reality, both of these calibration techniques may be difficult to implement in consumer-based products because it is unlikely a consumer would want to or could correctly perform such complicated and time-consuming calibration techniques. Moreover, if the camera calibration is performed incorrectly any results obtained from the camera will tend to be erroneous.

Accordingly, there exists a need for a calibration method and system for a catadioptric camera that is accurate and simple to use. This calibration method and system should be capable of self-calibrating using images of a scene obtained from camera, thereby eliminating the need for calibration patterns or user-supplied points. In addition, this self-calibration method and system would provide a wide variety of calibration parameters to enable accurate results from the catadioptric camera. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention includes a method and system for self-calibrating a wide field-of-view camera (such as a catadioptric camera) using a sequence of omni-directional images obtained from the camera. Based on characteristics of catadioptric imaging, the present invention self-calibrates the camera by determining a consistency of tracked features (such as points, lines and planes) across the sequence of images. This self-calibration method provides useful calibration parameters, including an aspect ratio and an image skew.

The system and method of the present invention is accurate and simple to use. In particular, the present invention is self-calibrating and uses images from a particular scene environment to calibrate the camera, thereby eliminating during calibration the need for calibration patterns, user-selected points, knowledge of camera motion or knowledge of the scene geometry. Moreover, the present invention is capable of determining a number of calibration parameters that ensure an accurate and thorough calibration so that the catadioptric camera system can produce accurate images of a particular scene.

In general, the calibration method of the present invention self-calibrates a catadioptric camera by obtaining a sequence of omni-directional images representing a scene, tracking features across the sequence and estimating a set of calibration parameters based on catadioptric imaging characteristics. The estimation of calibration parameters is performed by establishing a relationship (such as an objective function) between the feature tracks and the calibration parameters and estimating the calibration parameters using an error metric. An optimization technique is used to minimize the error metric and recover an optimal set of calibration parameters. The present invention uses at least two techniques to recover the calibration parameters, including an algebraic error metric and a preferred and more robust image error metric. In addition, the present invention generally determines more calibration parameters than other calibration techniques including, for example, an aspect ratio and an image skew. The present invention also includes a system for self-calibrating a wide field-of-view camera using a sequence of omni-directional images that incorporates the method of the present invention. Moreover, the present invention includes a technique for reformulating a projection equation (such as used in the working example) such that the projection equation is equivalent to that of a typical rectilinear perspective camera. This allows analyses (such as structure from motion) to be applied in the same direct manner as for rectilinear image sequences.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

Figure 1:
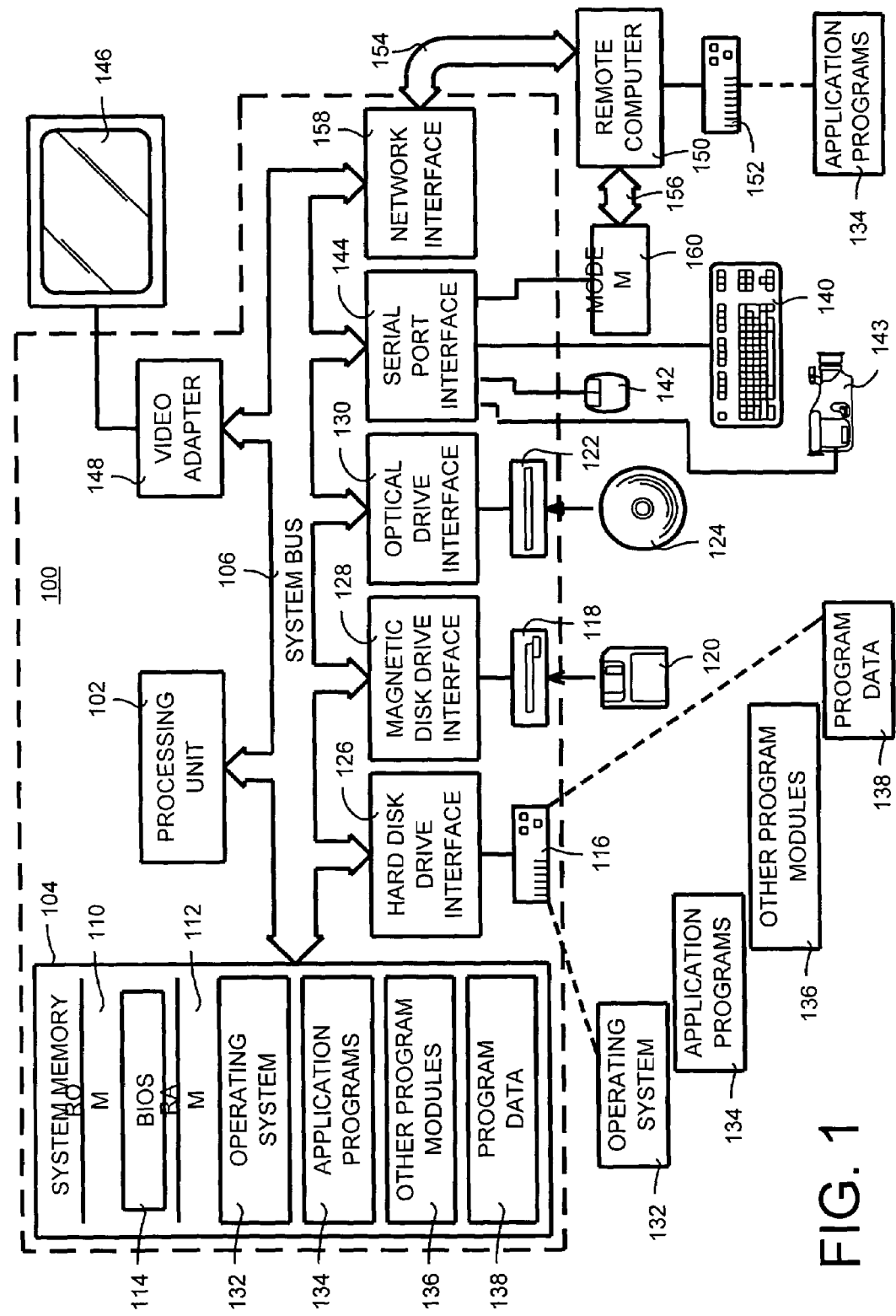
FIG. 1 is a block diagram illustrating an apparatus for carrying out the present invention.

FIG. 1 and the following discussion are intended to provide a brief, general description of a suitable computing environment in which the invention may be implemented. Although not required, the invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, mini- computers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk (not shown), a magnetic disk drive 118 for reading from or writing to a removable magnetic disk 120, and an optical disk drive 122 for reading from or writing to a removable optical disk 124 (such as a CD-ROM or other optical media). The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, a camera 143 (or other types of imaging devices) may be connected to the personal computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

II. Introduction

The method and system of the present invention include self-calibrating a catadioptric camera system to obtain a set of calibration parameters. These calibration parameters are used, for example, to remove distortion in images captured using the catadioptric camera system. The present invention uses a sequence of images taken by the camera system of a scene (or environment) and uses this sequence of images to calibrate the camera system. The present invention does not use special calibration patterns or need knowledge of camera motion or scene geometry. Instead, the present invention uses the consistency of features tracked across at least of portion of the image sequence and uses these tracked features to find calibration parameters based on the characteristics of catadioptric imaging. The self-calibration method and system of the present invention can obtain calibration parameters including, for example, aspect ratio and an image skew. The present invention also includes a method of transforming a projection equation for a catadioptric camera system into an equivalent rectilinear perspective using a transformation.

III. General Overview

Figure 2:
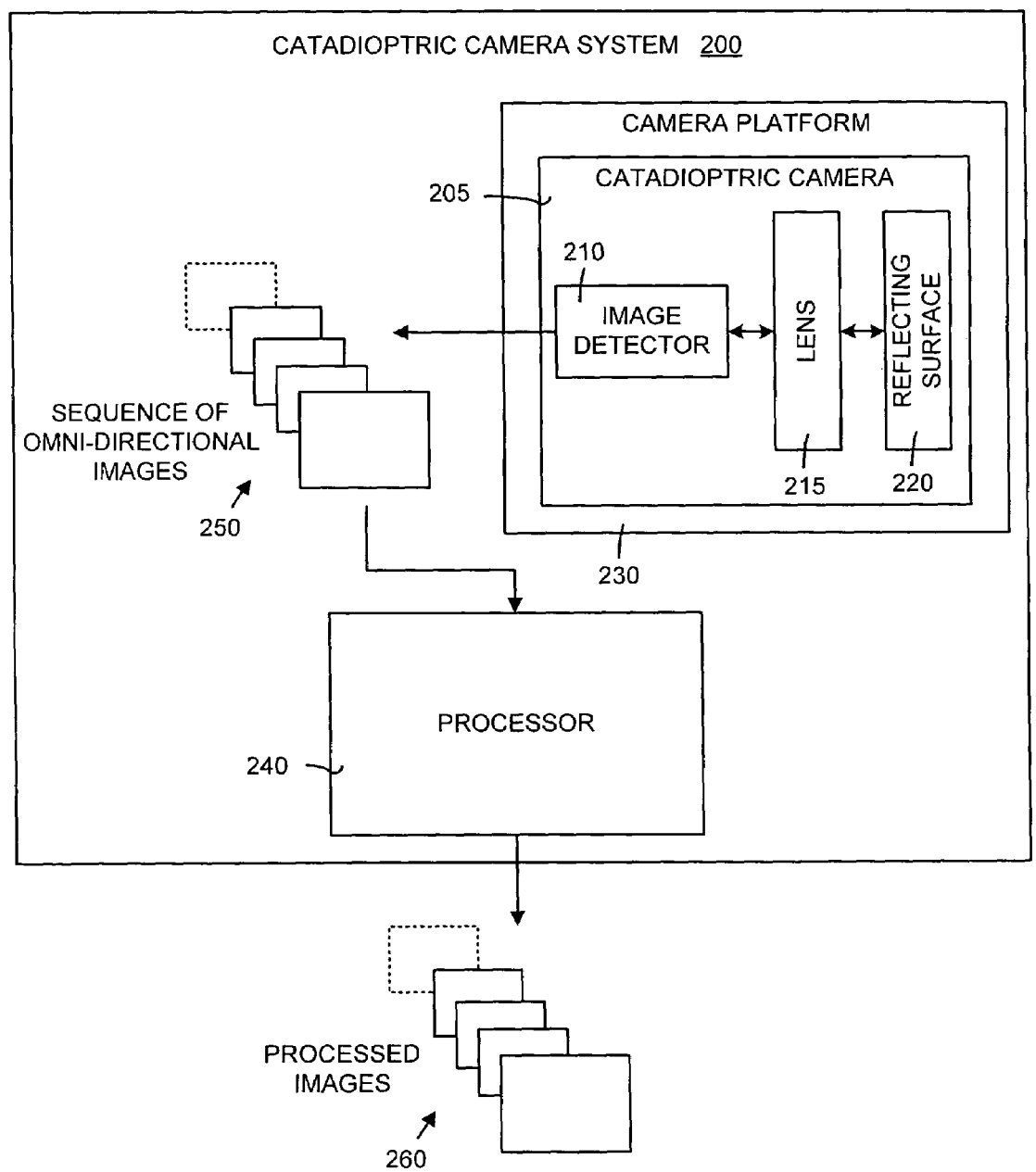
FIG. 2 is an overall block diagram of a catadioptric camera system incorporating the present invention.

As shown in FIGS. 2–7 for the purposes of illustration, the invention is embodied in a method and a system for self-calibrating a catadioptric camera system using a sequence of omni-directional images obtained from the camera system. FIG. 2 is an overall block diagram of a catadioptric camera system 200 incorporating the present invention. The camera system 200 illustrated is one example of several camera systems that may incorporate the self-calibration method and system of the present invention. In general, the catadioptric camera system 200 includes a catadioptric camera 205 including an image detector 210 (such as a charge-coupled device or CCD), a lens 215 (such as a telecentric lens) and a reflecting surface 220 (such as a mirror) that is directed toward a region of interest or scene (not shown). Typically, the catadioptric camera 205 (including the image detector 210, lens 215, and reflecting surface 220) are located on a camera platform 230 that permits the catadioptric camera 205 to be translated or rotated about at least some of the three-dimensional axes (not shown). A processor is connected to the catadioptric camera 205 and performs operations on data captured by the catadioptric camera 205 and calibration of the catadioptric camera system 200.

Generally, self-calibration of the catadioptric camera system 200 occurs in accordance with the present invention by positioning the catadioptric camera 205 on a scene. The camera platform 230 may be rotated and translated as needed to position the catadioptric camera 205 such that the desired scene is captured. The scene does not need to contain any type of calibration chart (and the like) and a user does not need to select points within the scene for calibration to occur. Rather, the present invention self-calibrates the catadioptric camera system 200 by obtaining a sequence (or collection) of omni-directional images 250 of the scene. This sequence of omni-directional images 250 has not been processed by the processor 240 and generally contains image distortions. The processor 240 receives the sequence of omni-directional images 250 and sends them to a self-calibration module (not shown) to be used in the calibration process, which is discussed further below.

After the catadioptric camera system 200 has been calibrated and calibration parameters obtained from the self-calibration module, the sequence of omni-directional images 250 obtained from the image detector 210 is sent to the processor. The processor applies the calibration parameters obtained from the self-calibration process of the present invention and outputs a collection of processed images 260. These processed images 260 may be used by other application modules, such as, for example, scene reconstruction, video conferencing or surveillance applications.

Figure 3:
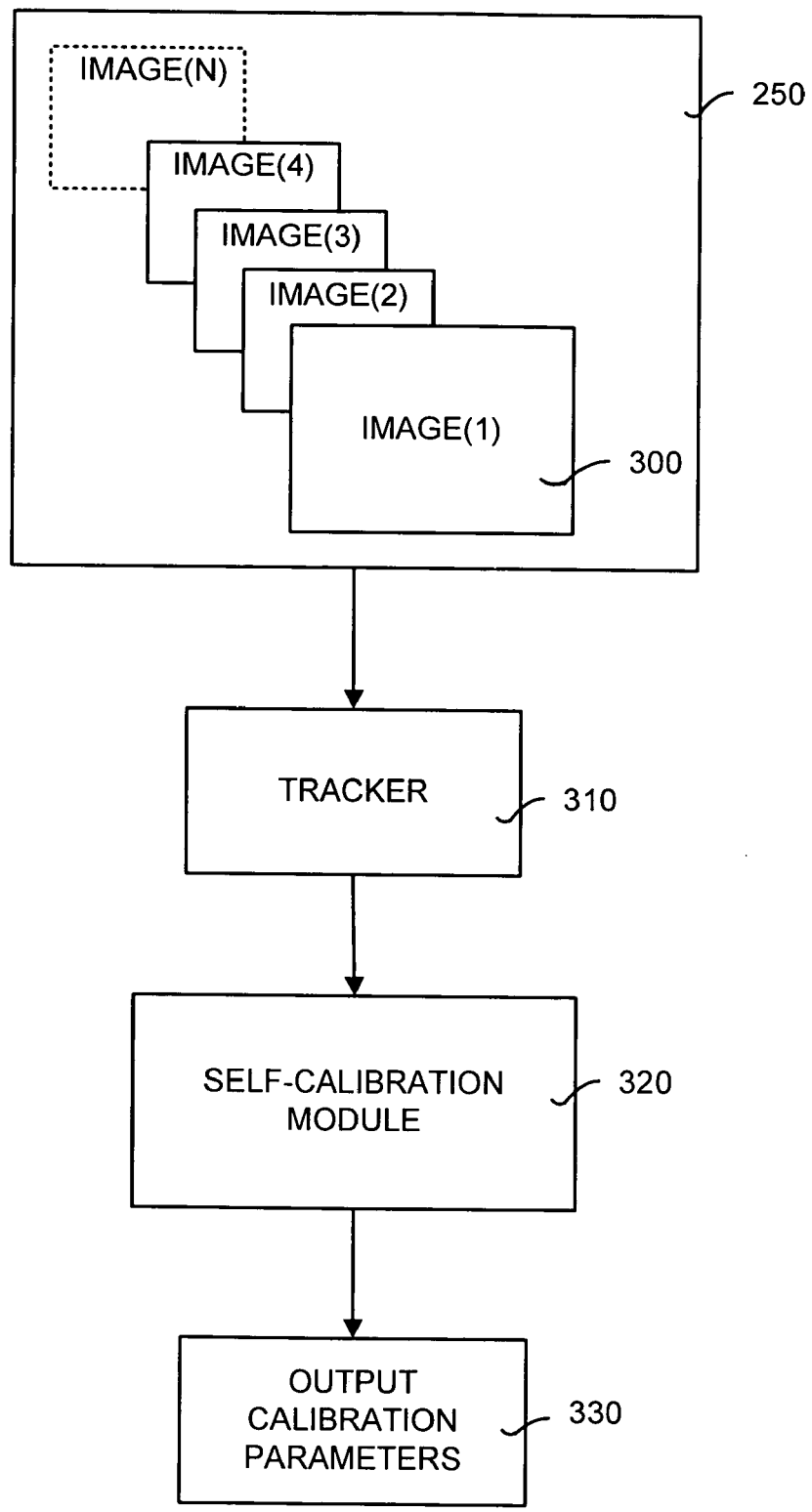
FIG. 3 is a general block diagram illustrating a method and system for self-calibrating a catadioptric camera using a sequence of omni-directional images in accordance with the present invention.

FIG. 3 is a general block diagram illustrating a method and system for self-calibrating the catadioptric camera system 200 using the sequence of omni-directional images 250 in accordance with the present invention. In particular, the image detector 210 obtains the sequence of omni-directional images 250 of the scene. This sequence of omni-directional images 250 includes several individual images 300 ranging from image(1) to image(N). The sequence of omni-directional images 250 is sent to a tracker 310 that detects features (such as points, lines and planes) within the sequence of omni-directional images 250 and tracks the positions of these features across the sequence 250. A self-calibration module 320 of the present invention receives the tracked features provided by the tracker 310 and, as explained in detail below, determines calibration parameters for the catadioptric camera system 200. These calibration parameters are sent as output for use by the catadioptric camera system 200 for providing accurate imaging results.

IV. General Operation of the Invention

Figure 4:
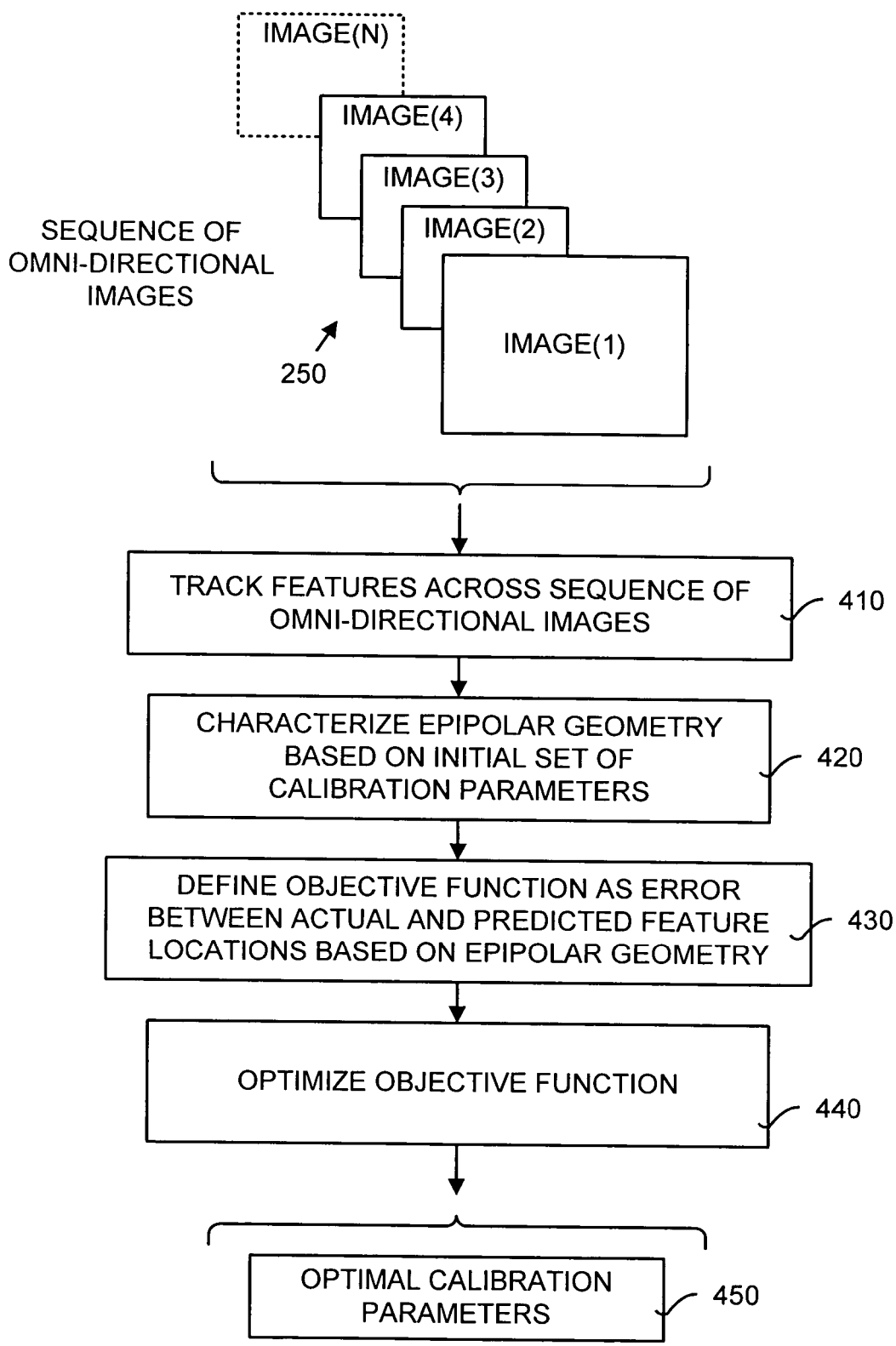
FIG. 4 is a general flow diagram of a self-calibration method of the present invention.

FIG. 4 is a general flow diagram of a self-calibration method of the present invention. Generally, the self-calibration method determines calibration parameters by using a consistency of tracked features across a sequence of images based on the characteristics of catadioptric imaging. These calibration parameters are used by the catadioptric camera system 200, for example, to eliminate distortion in images caused by the bending of light rays (i.e., to help make straight lines appear straight). The calibration process of the present invention is autonomous, and does not require user intervention such as special calibration patterns or selection of points on the image. Further, the present invention is convenient because no knowledge is needed of camera motion or scene geometry.

In particular, the self-calibration process of the present invention inputs the sequence of omni-directional images 250 (such as from the image detector 210). Features are tracked across the sequence of omni-directional images (box 410). Given an initial set of calibration parameters, the epipolar geometry, which links feature locations across two images within the sequence 250, can be defined (box 420). Once the epipolar geometry has been characterized, an objective function can be defined as the deviation from the epipolar geometry for features across two images (box 430). In other words, the objective function is the error between the actual and predicted feature locations based on epipolar geometry.

Once the objective function is defined, optimal calibration parameters can then be extracted by employing an optimization technique that will optimize the objective function (box 440). This optimization may include, for example, in a preferred embodiment, minimizing the objective function. The output of the self-calibration module 320 is the result of using the optimization technique to optimize the objective function and is the optimal calibration parameters (box 450). These optimal calibration parameters can then be applied to a variety of applications such as 3D structure recovery using the catadioptric camera system 200.

V. Details of the Invention and Working Example

Figure 5:
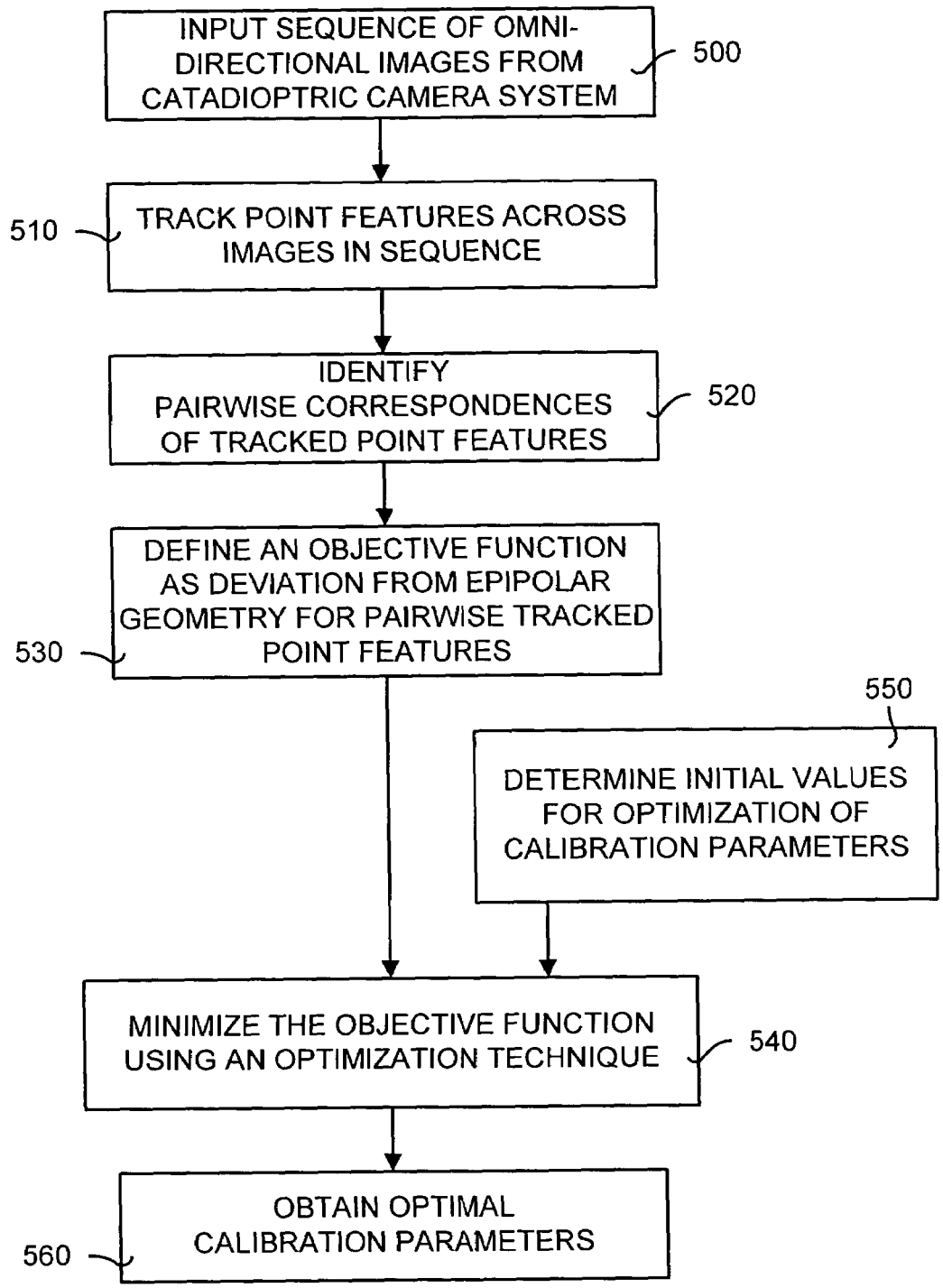
FIG. 5 is a detailed flow diagram illustrating a working example of FIG. 4 of the present invention.

FIG. 5 is a detailed flow diagram illustrating a working example of FIG. 4 of the present invention. This working example is provide for illustrative purposes and is only one of several ways in which the present invention may be implemented. The structural and mathematical details of this working example are discussed in detail below.

Referring to FIG. 5, a sequence of omni-directional images obtained from the catadioptric camera system is received as input (box 500). Next, point features are tracked across this sequence of images (box 510). Correspondences between point features across two different images are identified and used in the objective function to recover the calibration parameters (box 520). An objective function is defined as an error metric defined in terms of the deviation of pairwise correspondences from the epipolar geometry (box 530). The present invention includes two error metrics, both of which are defined in detail below. A preferred error metric is an image-based error metric that defines an image distance to an epipolar curve. The image-based error metric is preferred because it is more robust. An alternative error metric is an algebraic error metric that is not as robust as the preferred image-based error metric.

The error metric is used to find an optimal set of calibration parameters that minimizes the error of the objective function. The optimum set of calibration parameters can be obtained by minimizing the objective function using an optimization technique (box 540). These optimization techniques are known to those skilled in the art. Prior to using the optimization technique, initial values of at least some of the unknown calibration parameters are selected as a starting point for the optimization (box 550). These initial values may be reasonable guesses or based on another calibration technique such as, for example, a circle-based calibration technique discussed in detail below. Optimal calibration parameters then are obtained from this optimization (box 560).

In this working example, the catadioptric camera system is a stand alone, movable system that is capable of capturing long sequences of omni-directional images. One application of this system is to reconstruct complex large environments, such as an entire floor of a building, from the captured images only. The camera system includes a color camera having a resolution of 1140×1030 pixels and a catadioptric attachment including a panoramic lens and paraboloid mirror. The camera and catadioptric attachment are located on a platform that includes a direct current (DC) motor that aids in positioning the camera. An uninterruptable power supply (UPS) is used to provide remote power, and processing is performed by a personal computer having a 450 MHz processor with 2 gigabytes (GB) of random access memory (RAM) and a flat-panel display.

The large RAM size enables slightly more than 1,500 omni-directional images to be captured on the fly in the raw image mode of 1 byte per pixel. Specifically, up to 1,500 images at 6.7 Hertz (Hz) and a resolution of 1140×1030 may be captured by this system. The rate of capture can be as high as 11.75 frames per second. With the use of the UPS, the system can perform standalone capture for about half an hour.

In this working example, collections of images were taken under two conditions. The first condition was while the camera was being rotated about a vertical axis by the motor (which has variable speeds) while the platform was stationary. The other condition was while the camera was stationary with respect to the platform and the platform was manually moved.

In the self-calibration method of the present invention embodied in this working example, point features were tracked across a sequence of omni-directional images. The camera system contained a set of "blind spots" caused by obstruction of view by the supports for the mirror and camera. Point features tracked along the perimeter of these "blind spots" could not be assumed to be stationary across the collection, because it was possible that erroneous point feature tracks could occur due to occluded edges giving rise to spurious corners. In order to avoid the problems caused by the "blind spots" within the collection of images, a mask was created that was used by the self-calibration method to ignore points inside or within five pixels of the mask boundary.

The point feature tracks in this working example were generated using a tracker developed by J. Shi and C. Tomasi entitled "Good Features to Track" in *CVPR*, pages 593–600, Seattle, Wash. (June 1994), the entire contents of which are hereby incorporated by reference. In this working example, the point features were not tracked across a long collection of images because of the highly distorting imaging characteristics of the catadioptric camera. Instead, a point feature tracking was performed across a collection of 20–30 images spanning between 15 and 25 degrees.

Imaging Characteristics of a Catadioptric Camera System

In the self-calibration method of the present invention, a set of unknown calibration parameters are defined using imaging characteristics of the catadioptric camera system. The mathematical details of the present invention are presented below.

Figure 6:
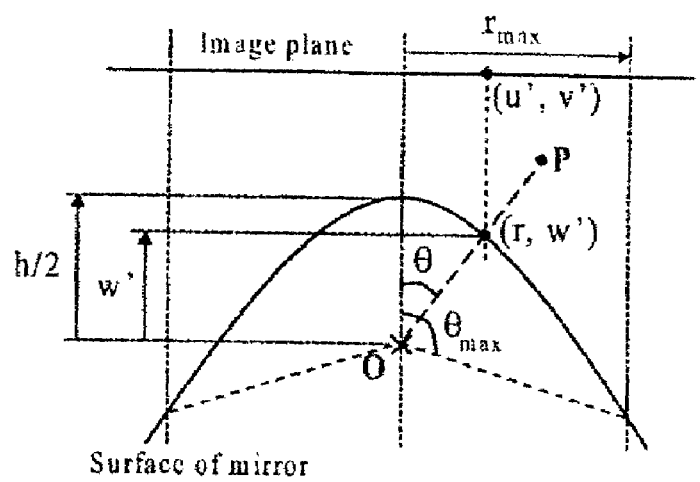
FIG. 6 illustrates a cross-section of a portion of the catadioptric camera used in the working example.

The catadioptric camera system consists of a telecentric lens that is designed to be orthographic and a paraboloid mirror. FIG. 6 illustrates a cross-section of the image plane-mirror representation through the center (or focus) of the paraboloid mirror.

The expression for the mirror surface is $$w' = \frac{h^2 - (u'^2 + v'^2)}{2h} = \frac{h^2 - r^2}{2h} \qquad (1)$$

An actual observed image pixel location (u,v) is linked to a camera pixel location (u',v') by a calibration matrix M:

$$\begin{pmatrix} u \\ v \\ 1 \end{pmatrix} = \begin{pmatrix} 1 & s & p_x \\ 0 & r & p_y \\ 0 & 0 & 1 \end{pmatrix} \begin{pmatrix} u' \\ v' \\ 1 \end{pmatrix} = M \begin{pmatrix} u' \\ v' \\ 1 \end{pmatrix} \quad (2)$$

where $\alpha$ is an aspect ratio, s is an image skew, and $(p_x, p_y)$ is a principal point.

The present invention also includes a method of transforming a projection equation for a catadioptric camera system into an equivalent rectilinear perspective using a transformation. In other words, the projection equation of the catadioptric camera system can be converted, using the following method, to a form of a rectilinear perspective camera through a transformation of the z coordinate. In particular, a point $P=(x,y,z)^T$ relative to O in FIG. 6 is mapped to camera pixel $(u',v')^T$. The actual 3D point on the mirror surface that P is projected onto is given by the projection equation $$q = \begin{pmatrix} u' \\ v' \\ w' \end{pmatrix} = \begin{pmatrix} u' \\ v' \\ \frac{h^2 - (u'^2 + v'^2)}{2h} \end{pmatrix} = \lambda \begin{pmatrix} x \\ y \\ z \end{pmatrix}, \quad (3)$$

with $\lambda > 0$. Hence $$\lambda z = \frac{h^2 - (\lambda^2 x^2 + \lambda^2 y^2)}{2h} \quad (4)$$

Solving for $\lambda$, gives $$\lambda = h \frac{\sqrt{x^2 + y^2 + z^2} - z}{x^2 + y^2} \quad (5)$$

$$= h \frac{(\sqrt{x^2 + y^2 + z^2} - z)(\sqrt{x^2 + y^2 + z^2} + z)}{(x^2 + y^2)(\sqrt{x^2 + y^2 + z^2} + z)}$$

$$= \frac{h}{\sqrt{x^2 + y^2 + z^2} + z} = \frac{h}{|P| + z} = \frac{h}{z'}$$

As a result, the projection equation can be rewritten as $$\begin{pmatrix} u' \\ v' \\ 1 \end{pmatrix} = \begin{pmatrix} h\frac{x}{z'} \\ h\frac{y}{z'} \\ 1 \end{pmatrix}, \quad (6)$$

or $$z' \begin{pmatrix} u' \\ v' \\ 1 \end{pmatrix} = \begin{pmatrix} h & 0 & 0 \\ 0 & h & 0 \\ 0 & 0 & 1 \end{pmatrix} \begin{pmatrix} x \\ y \\ z' \end{pmatrix} = H \begin{pmatrix} x \\ y \\ z' \end{pmatrix} \quad (7)$$

Substituting Equation 7 into Equation 2, gives $$z' \begin{pmatrix} u \\ v \\ 1 \end{pmatrix} = MH \begin{pmatrix} x \\ y \\ z' \end{pmatrix} = M_{all} \begin{pmatrix} x \\ y \\ z' \end{pmatrix} \quad (8)$$

This is the form for rectilinear perspective projection. Therefore, using this formulation, structure from motion on the tracks in the omni-directional image sequence can be applied in the exact manner as for rectilinear image sequences. The actual 3D points $(x,y,z)^T$ can then be computed from the resulting "pseudo" 3D points $(x,y,z')^T$ using the relationship $$z = \frac{z'^2 - (x^2 + y^2)}{2z'} \quad (9)$$

since $z' = \sqrt{x^2 + y^2 + z^2} + z$. This projection equation transformation of the present invention can be used in the determination of calibration parameters to recover structure from image collections.

Epipolar geometry may also be considered when determining the calibration parameters. In particular, for a pair of images with indices 1 and 2, corresponding points (in homogeneous coordinates to indicate their positions on the mirror surface) satisfy the epipolar constraint $$q_{j2}^T E q_{j1} = 0, \quad (10)$$

where E is the essential matrix associated with the image pair, and $q_{jk}$ is defined in Equation 3.

Figure 7:
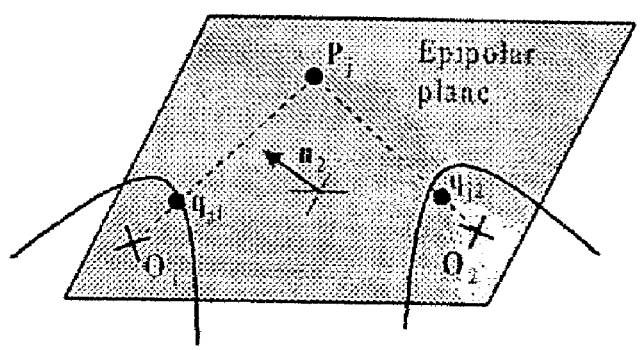
FIG. 7 illustrates the epipolar plane passing through a 3D point in space, two corresponding point features imaged at two catadioptric camera locations, as well as the two camera centers.

FIG. 7 illustrates an epipolar plane for cameras positioned at $O_1$ and $O_2$, wherein $q_{j1}$ and $q_{j2}$ are the respective projections of 3D point $P_j$. From FIG. 7, the normal to the plane passing through both camera centers (with respect to $O_2$) is $$n_2 = E q_{j1} = \begin{pmatrix} a \\ b \\ c \end{pmatrix} \quad (11)$$

Hence, the equation of the plane is of the form $$n_2 \cdot p = 0 \text{ or } au' + bv' + cw' = 0 \quad (12)$$

After substituting Equation 1 into Equation 12 and rearranging terms, $$u'^2 + v'^2 - 2\frac{ah}{c}u' - 2\frac{bh}{c}v' - h^2 = 0 \quad (13)$$

This is the equation of a circle centered at $$\left( \frac{ah}{c}, \frac{bh}{c} \right)$$

with a radius of $$\frac{h}{c}\sqrt{a^2+b^2+c^2}.$$

Equation 13 may be rewritten as $$(u'\ v'\ 1)\begin{pmatrix} 1 & 0 & -\frac{ah}{c} \\ 0 & 1 & -\frac{bh}{c} \\ -\frac{ah}{c} & -\frac{bh}{c} & h^2 \end{pmatrix}\begin{pmatrix} u' \\ v' \\ 1 \end{pmatrix} = (u'\ v'\ 1)A\begin{pmatrix} u' \\ v' \\ 1 \end{pmatrix} = 0 \quad (14)$$

From Equation 2, the epipolar curve is obtained in the second image corresponding to $q_{j1}$ in the first image as $$(u\ v\ 1)M^{-T}AM^{-1}\begin{pmatrix} u \\ v \\ 1 \end{pmatrix} = (u\ v\ 1)A'\begin{pmatrix} u \\ v \\ 1 \end{pmatrix} = 0 \quad (15)$$

Circle-Based Calibration Technique

The circle-based technique is used in this working example to determine initial values for some of the unknown calibration parameters. This circle-based technique uses a single image to identify a bounding circle of the omni-directional image. This may be done manually or automatically by using a predefined threshold, finding a boundary and fitting a circle to the resulting boundary. The center of the circle is defined as an image principal point. Since the field of view of the omni-directional image is known (105° in the catadioptric attachment of this working example), a camera parabolic parameter can then be directly computed using the radius of the circle.

Referring to FIG. 6, the relationship between the mirror parameter h and the radius of the omni-directional image may be determined. In particular, from $$z = \frac{h^2 - r^2}{2h} \text{ and } t = \tan\theta = \frac{r}{z} \quad (16)$$

gives $$t = \frac{2rh}{h^2 - r^2} \quad (17)$$

After some manipulation, the following expression is obtained $$h = r\frac{1 + \sqrt{1+t^2}}{t} = r\cos\frac{\theta}{2} \quad (18)$$

Therefore, h may be computed if $r = r_{max}$ (i.e., the radius of the omni-directional image) is known corresponding to $\theta = \theta_{max} = 105°$. As explained further below, this circle-based calibration technique may be used to determine initial values for some of the unknown calibration parameters.

Estimation of Calibration Parameters

The estimation of a set of unknown calibration parameters (i.e., h, $(p_x, p_y)$, r, and s as defined in Equations 1 and 2) is accomplished by using a least-median error metric. In this working example, an exhaustive combination of pairs of images were used that were at least four frames apart and had a minimum of 10 correspondences in an objective function to be minimized. This maximized the use of point features and avoided possible degenerations associated with very small camera motion. Estimation of essential matrix of pairs of images was performed using a method described by Z. Zhang entitled "Motion and structure from two perspective views: From essential parameters to Euclidean motion via fundamental matrix" in *J. of the Optical Soc. of America A*, 14(11):2938–2950 (1997), the entire contents of which are hereby incorporated by reference.

To recover the calibration parameters, an objective function $$O = \sum_{i=1}^{N_{pairs}} med_{j \subset S(b_i, e_i)} \varepsilon_{ij} \quad (19)$$

was defined where $N_{pairs}$ is the number of different image pairs, "med" refers to the median of the series of errors, $\varepsilon_{ij}$, $b_i$ and $e_i$ are the image numbers corresponding to the ith pair, and $S(b_i, e_i)$ is the set of indices of point feature tracks that spans across at least images $b_i$ and $e_i$. $\varepsilon_{ij}$ can be an algebraic error metric $$\varepsilon_{ij}^{(1)} = (q_{j,e_i}^T E_i q_{j,b_i})^2 \quad (20)$$

or an image error metric $$\varepsilon_{ij}^{(2)} = d^2(q_{j,e_i}^T, E_i q_{j,b_i}) + d^2(q_{j,b_i}^T, E_i q_{j,a_i}) \quad (21)$$

where d(m, n) is the image distance from m to the epipolar curve specified by n of the form specified in Equation 15. In this working example, the image-based error metric was used.

In the present invention, estimation of the unknown calibration parameters (h, $(p_x, p_y)$, a, and s) is performed using an optimization method. These optimization methods are known to those skilled in the art. In this working example, the Nelder-Mead simplex search algorithm was used. The initial values of h and $(p_x, p_y)$ were determined by using a circle based calibration technique described above. The initial values of a and s were selected to as 1 and 0, respectively. This technique of estimating the unknown calibration parameters was used for this working example because the technique is guaranteed to converge to a local minimum and is simple to implement.

Results

The self-calibration method of the present invention as implemented in this working example were applied to a number of different image collections and produced results that were consistently better than existing calibration techniques. The known straight lines in a processed (or dewarped) images produced with the calibration parameters determined by the present invention appear to be straight. While existing calibration techniques did on occasion produce reasonable results, they were not as consistent as those of the self-calibration method using the preferred image-based error metric. Table 1 numerically illustrates that the self-calibration method of the present invention using the preferred image-based error metric produced the most favorable results. The numerical outputs shown in Table 1 are for the same collection of images (both h and p are in pixels).

TABLE 1

|   | Circle-based | Algebraic error | Image error |
|---|---|---|---|
| h | 345.33 | 530.85 | 408.28 |
| p | (630.54, 480.78) | (609.36, 410.50) | (575.22, 453.62) |
| α | — | 0.988621 | 0.952877 |
| s | — | −0.001724 | 0.002096 |

In order to verify that the calibration parameters obtained from the self-calibration method using the preferred image-based error metric are superior, a validation was performed using calibration parameters obtained from the circle-based calibration technique, the self-calibration method using the algebraic error metric and the image-based error metric. Specifically, a mosaic of an office was extracted using a sequence of parallax-free images. The camera was rotated such that the rotation axis passed through the virtual projection center of the camera. This was accomplished by continually adjusting the position of the camera and checking for parallax by rotating the camera and viewing the images. In this working example, a collection of 180 images were used, each about 1° apart. Because the maximum angular field of view for each camera was approximately 210°, the total span was about 389°, which was enough to wrap around itself. In addition, there was no enforcement of the closed loop constraint in constructing the mosaic.

Using the calibration parameters obtained from the circle-based calibration technique, the mosaic appeared blurred. In contrast, the calibration parameters obtained using the other two techniques appeared more in focus. However, the calibration parameters obtained using the algebraic error metric did not close properly, probably due to underestimation of the rotation angle. The self-calibration method using the image-based error metric provided the best dewarped image.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for automatically determining calibration parameters for a catadioptric camera, comprising:
   tracking point features across a sequence of omni-directional images obtained from the camera;
   identifying correspondences between the tracked point features;
   defined an objective function using the correspondences; and
   finding calibration parameter using the objective function, wherein the calibration parameters include an aspect ratio and a skew.

2. The method of claim 1, further comprising defining the objective function in terms of a deviation of pairwise correspondences from an epipolar geometry.

3. The method of claim 2, wherein the pairwise correspondences are an error between an actual and a predicted tracked point feature location based on the epipolar geometry.

4. The method of claim 3, further comprising linking the actual location (u,v) of the tracked point feature to a pixel location (u',v') of the catadioptric camera by using a calibration matrix M, wherein M is defined as:

$$\begin{pmatrix} u \\ v \\ 1 \end{pmatrix} = \begin{pmatrix} 1 & s & p_x \\ 0 & r & p_y \\ 0 & 0 & 1 \end{pmatrix} \begin{pmatrix} u' \\ v' \\ 1 \end{pmatrix} = M \begin{pmatrix} u' \\ v' \\ 1 \end{pmatrix}$$

and wherein r is the aspect ration, s is the skew, and $(P_x, p_y,)$ is a principal point.

5. The method of claim 4, wherein the catadioptric camera further comprises a telecentric lens that is designed to be orthographic and a paraboloid mirror.

6. The method of claim 5, further comprising defining a surface of the parapoloid mirror by the equation:

$$w' = \frac{h^2 - (u'^2 + v'^2)}{2h} = \frac{h^2 - r^2}{2h}.$$

7. The method of claim 3, further comprising defining an error metric in terms of the pairwise correspondences.

8. The method of claim 7, wherein the error metric is an image-based error metric, $\epsilon_{ij}^{(2)}$, given by the equation:

$$\epsilon_{ij}^{(2)} = d^2(q_{j,e_i}^T, E_i q_{j,b_i}) + d^2(q_{j,b_i}^T, E_i^T q_{j,a_1}),$$

wherein d(m,n) is an image distance from m to an epipolar curve specified by n.

9. The method of claim 7, wherein the error metric is an algebraic error metric, $\epsilon_{ij}^{(1)}$, given by the equation, $$\epsilon_{ij}^{(1)} = (q_{j,e_i}^T E_i q_{j,b_i})^2.$$

10. A computer-readable medium having computer-executable instructions for performing the method recited in claim 1.

11. A computer-implemented process for calculating an image skew and an aspect ratio of a catadioptric camera, comprising:
    a capture step for capturing a sequence of images from the catadioptric camera;
    a tracking step for tracking point features across at least two images of the sequence of images;
    a definition step for defining an objective function as an error between actual and predicted locations of the point features in the at least two images based on epipolar geometry; and
    an extraction step for automatically extracting the image skew and the aspect ratio from the objective function.

12. The computer-implemented process as set forth in claim 11, further comprising an initialization step for determining initial values for unknown calibration parameter of the catadioptric camera.

13. The computer-implemented process as set forth in claim 12, wherein the initialization step further comprises using a circle-based calibration technique that uses a single image to identify a bounding circle within the sequence of images.

14. The computer-implemented process as set forth in claim 11, wherein the definition step further comprises defining the objective function, O, as:

$$O = \sum_{i=1}^{N_{pairs}} med_{j \subset S(b_i, e_i)} \varepsilon_{ij}.$$

15. The computer-implemented process as set forth in claim 14, further comprising a minimization step for minimizing the objective function, O, to automatically extract the image skew and the aspect ratio.

16. A computer-readable medium having computer-executable instructions for extracting an image skew and an aspect ratio from calibration parameters obtained for a catadioptric camera, comprising:
capturing an image sequence using the catadioptric camera;
tracking point features across the image sequence;
defining an objective function based on epipolar geometry and an error between actual and predicted locations of the point features in the image sequence; and
optimizing the objective function to extract the image skew and the aspect ratio.

17. The computer-readable medium of claim 16, wherein optimizing the objective function further comprises minimizing the objective function using an optimization technique.

18. The computer-readable medium of claim 17, further comprising selecting initial values of the calibration parameters as a starting point for the optimization technique.

19. The computer-readable medium of claim 16, further comprising transforming a projection equation for the catadioptric camera into an equalivalent rectilinear perspective using a transformation.

20. The computer-readable medium of claim 19, wherein the transformation is given by:

$$q = \begin{pmatrix} u' \\ v' \\ w' \end{pmatrix} = \begin{pmatrix} u' \\ v' \\ \frac{h^2 - (u'^2 + v'^2)}{2h} \end{pmatrix} = \lambda \begin{pmatrix} x \\ y \\ z \end{pmatrix}.$$

* * * * *